United States Patent [19]
Cowles

[11] Patent Number: 5,201,135
[45] Date of Patent: Apr. 13, 1993

[54] HEAT SHIELD-PARALLAX/GLARE REDUCTION DEVICE

[76] Inventor: Russell H. Cowles, P.O. Box 942, Indian Hills, Colo. 80454

[21] Appl. No.: 697,234

[22] Filed: May 6, 1991

[51] Int. Cl.⁵ .................. F41G 1/38; G02B 23/00
[52] U.S. Cl. ...................... 42/101; 33/244; 359/600; 359/892
[58] Field of Search .......... 42/100, 101; 33/244; 350/276 R, 580, 579

[56] References Cited

U.S. PATENT DOCUMENTS

| | | | |
|---|---|---|---|
| 4,089,117 | 5/1978 | Villarreal | 42/101 |
| 4,926,560 | 5/1990 | Kilgore et al. | 33/244 |

FOREIGN PATENT DOCUMENTS

| | | | |
|---|---|---|---|
| 359971 | 3/1962 | Switzerland | 350/580 |
| 501710 | 3/1939 | United Kingdom | 350/580 |

*Primary Examiner*—Charles T. Jordan
*Attorney, Agent, or Firm*—Timothy J. Martin; Dana S. Rewoldt

[57] ABSTRACT

The heat shield-parallax/glare reduction device described in this application is produced by conventional machining methods from tempered aluminum. It provides for the elimination of vision distortion from barrel heat and is an effective sunshield. With the addition of one or more types of optical filters and polarization devices the shooter is able to control the condition of the light entering the lens and adjust for different environmental situations. The shield due to its length is also effective in the reduction of parallax error.

7 Claims, 2 Drawing Sheets

HEAT SHIELD-PARALLAX/GLARE REDUCTION DEVICE

FIELD OF THE INVENTION

The present invention is directed to optical scopes and, in particular, to optical scopes mounted on firearms. Accordingly, the present invention has specific application in the firearm and hunting industries.

BACKGROUND OF THE INVENTION

Currently, use of optical scopes on firearms is hampered by several major disadvantages. First, optical scopes are vulnerable to glare caused by direct sunlight hitting the light gathering lens of the scope. Second, the field of view seen through a scope is subject to distortion caused by heat rising from the gun barrel. Lastly, inadvertent displacement of the eye of a viewer results in a parallax displacement of objects seen through the scope. Additionally, most scopes make no provision for the attachment of additional optical filters or polarizers.

Although devices have been developed which shade optical scopes from glare, such as U.S. Pat. No. 4,089,117 to Villarreal and U.S. Pat. No. 4,926,560 to Kilgore et al, no devices exist which address the problems of heat distortion and parallax shift. Thus, there exists a further need for a device which will not only prevent glare but will also eliminate the problems of heat distortion and parallax shift and allow for the attachment of filters and polarizers.

SUMMARY OF THE INVENTION

It is therefore an object of the present invention to provide a novel and useful scope accessory adapted for mounting onto an optical scope whereby the optical scope is shielded from direct sunlight.

It is a further object of the present invention to provide a scope accessory adapted for mounting onto an optical scope, attached to a firearm, whereby the line of sight of a viewer looking through said optical scope is protected from distortion caused by heat rising from the barrel of said firearm.

Yet another object of the present invention is to provide a scope accessory adapted for mounting onto an optical scope whereby the line of sight of a viewer looking through an optical scope is constrained to extend in a nearly parallel relation to the longitudinal axis of the optical scope, whereby parallax shift of objects viewed through the optical scope is eliminated.

It is still a further object of the present invention to provide a scope accessory adapted for mounting onto an optical scope whereby a plurality of different optical filters and polarizers may be used in conjunction with the optical scope and/or the scope accessory.

Yet another object of the present invention is to provide a scope accessory adapted for mounting onto an optical scope wherein the article is adaptable to mount onto a plurality of different optical scopes.

In order to accomplish these objects, the present invention is directed to a scope shield which is attached to the light gathering end of an optical scope that has a longitudinal viewing axis and which is adapted to mount onto a firearm such as a rifle. The scope shield extends relatively rigidly from the light gathering end of the optical scope colinearly with the longitudinal viewing axis of the optical scope. In its broad form, the present invention includes an elongated tubular member that is rigidly securable to an optical scope such as, for example, a telescope on a rifle, so that the longitudinal axis of the tubular member extends in parallel relation with the longitudinal axis of the barrel of the firearm. Thus, the line of sight through said optical scope extends along the central longitudinal axis of said elongated tubular member. The elongated tubular member is designed with a selected longitudinal length whereby, when the scope shield is mounted onto an optical scope which in turn is mounted on the firearm, the elongated tubular member extends alongside the barrel over a sufficient length to shield against optical distortion caused by heat rising from the barrel. The longitudinal length of the elongated tubular member also aids in reducing parallax error by helping to keep a user's line of sight correctly aligned with the longitudinal axis of the optical scope. Slight movement of the user's line of sight from a line parallel with the longitudinal axis of the optical scope results in an immediate reduction in the field of view seen through the optical scope, thereby alerting the user that his line of sight is not parallel with the longitudinal axis of the optical scope. Additionally, the elongated tubular member blocks direct sunlight from hitting the light gathering lens of the optical scope.

In the exemplary embodiment, a scope adapter interconnects the tubular member to the light gathering end of the optical scope. The scope adapter is provided at the second end of the tubular member opposite the scope adapter and includes a first end configured to allow mounting onto an optical scope, and a second end configured to attach to said elongated tubular member. A filter adapter including a first end configured to attach to said elongated tubular member and a second end adapted to mountably receive on optical filter. Preferably, the scope and filter adapters attach to the elongated tubular member by means of a press fit, and are threadably mounted respectively to the optical scope and optical filter. In one embodiment, the elongated tubular member includes chamfers on both ends which abut against shoulders included in both the scope and filter adapters. These shoulders precisely control the relative positions of the elongated tubular member and the filter and scope adapters when the three components are press fitted together.

These and other objects of the present invention will become more readily appreciated and understood from a consideration of the following detailed description of the preferred embodiment when taken together with the accompanying drawings, in which:

DETAILED DESCRIPTION OF THE EXEMPLARY EMBODIMENTS

The present invention relates to an accessory for optical scopes which are normally subject to glare, heat distortion and parallax shift. As such, the present invention has particular applicability to scopes which are attached to firearms. However, it should be appreciated by one ordinarily skilled in the art that the many features described herein can extend to a variety of types of optical scopes in addition to those specifically mentioned.

Figure 1:
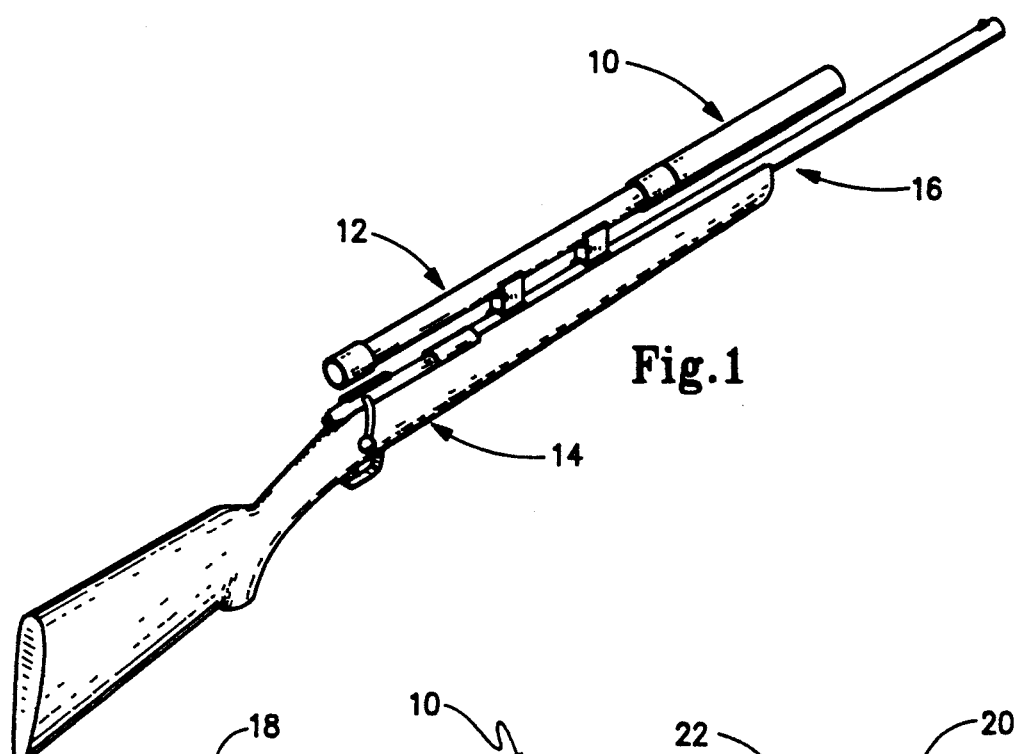
FIG. 1 is a perspective view of the scope accessory of the present invention shown mounted on an optical scope attached to a rifle.

In FIG. 1, the scope accessory 10 is shown attached to scope 12 which is in turn attached to rifle 14. As can be seen from this Figure, scope accessory 10 extends forwardly of and in a collinear relationship with scope 12. Scope accessory 10 also extends above and in a parallel relation with barrel 16 of rifle 14. As is well know, scopes, such as scope 12 have longitudinal viewing axes along which a user views an object with enhanced detail. The scope 12 is thus mounted so that the viewing axis is parallel to the axis of barrel 16.

Figure 2:
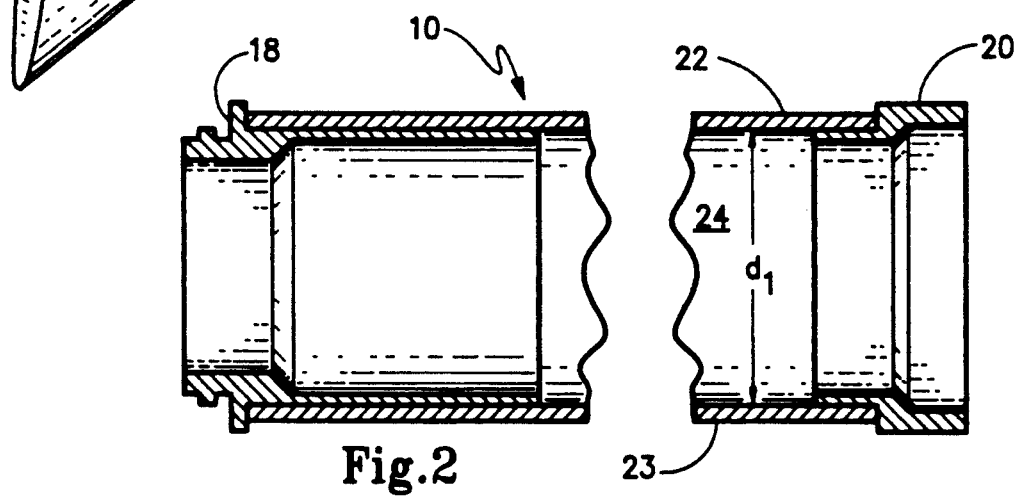
FIG. 2 is a side view in cross-section of the scope accessory of FIG. 1.

FIG. 2 shows scope accessory 10 of the present invention in cross-section. As can be seen from this Figure, scope accessory 10 is comprised by three separate elements: scope adapter 18, filter adapter 20 and elongated tubular member 22. Scope adapter 18 and filter adapter 20 are slidably received in either end of tubular member 22 and are held securely therein by means of a press fit.

Figure 3A:
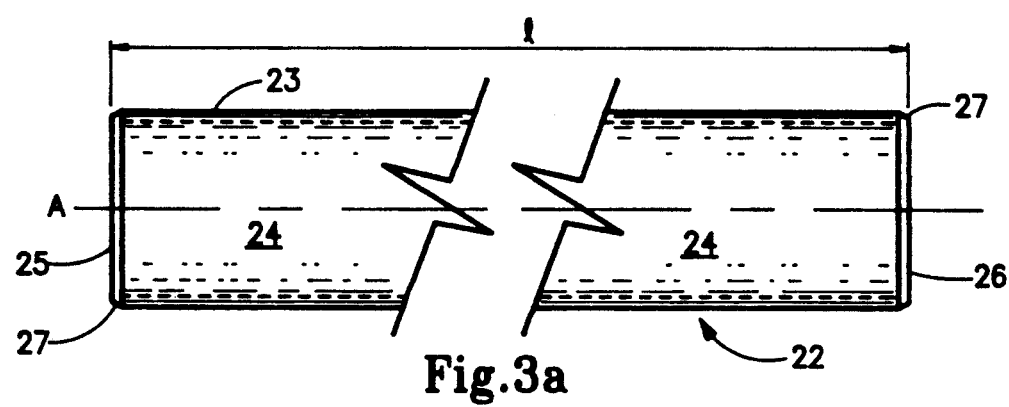
FIG. 3(a) is a side view in elevation of the tubular body of the scope accessory of FIG. 2
Figures 3B, 4A:
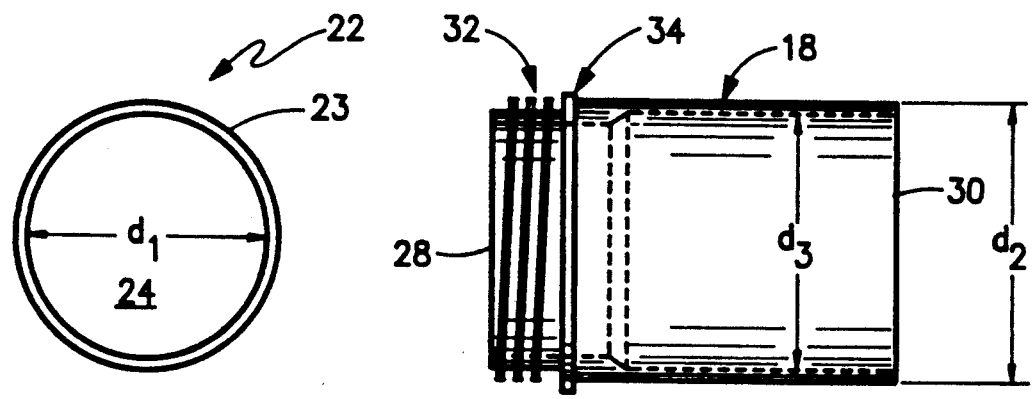
FIG. 3(b) is an end view in elevation thereof.
FIG. 4(a) is a side view in elevation of the scope adapter of the scope accessory of FIG. 2

Elongated tubular member 22 is best shown in FIGS. 2, 3(a) and 3(b) where it may be seen that sidewall 23 surrounds an interior 24. Tubular member 22 has opposite ends 25 and 26 provided with chamfers 27. Accordingly, tubular member 22 has a longitudinal length "l", and an inside diameter "d" and a central longitudinal axis "A" that defines the longitudinal axis for scope shield 10.

Figure 4B:
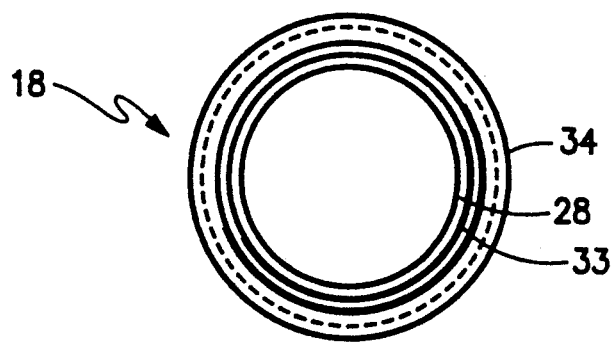
FIG. 4(b) is an end view in elevation thereof.

In FIG. 4(a) and 4(b), scope adapter 18 is shown in both side and cross-sectional views. From the side view it may be seen that scope adapter 18 includes a first end 28 and a second end 30. First end 28 includes a threaded section 32 having threads 33 which extend for a threaded section length between end 28 and a shoulder 34. Threaded section 32 possesses a standard number of threads per inch and is sized to mount onto the threaded light receiving end of a typical optical scope. Second end 30 has an outside diameter "$d_2$" that is slightly smaller than the inside diameter "$d_1$" of tubular member 22 so that they may be secured together by mated press-fit engagement. Scope adapter 18 has an inside diameter "$d_3$".

Figures 5A, 5B:
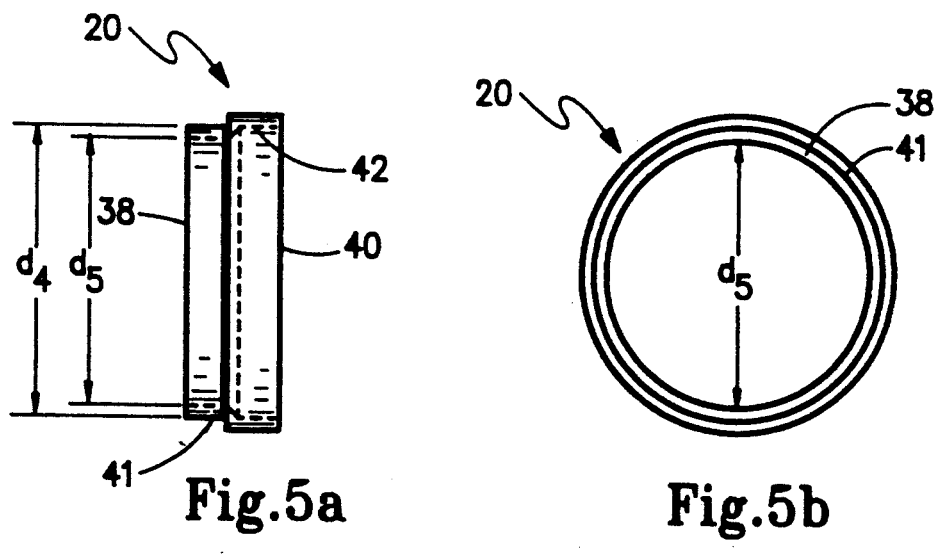
FIG. 5(a) is a side elevation of the filter adapter of the scope accessory of FIG. 2
FIG. 5(b) is an end view in elevation thereof.

Filter adapter 20 is best shown in FIGS. 5(a) and 5(b). Here, filter adapter 20 is seen to have a first end 38, a second end 40 and a shoulder portion 41. First end 38 has an outside diameter "$d_4$", and an inside diameter "$d_5$". Preferably, $d_4 = d_2$ and $d_5 = d_3$. Accordingly, tubular member 22 and filter adapter 20 may be secured together by mated press-fit engagement. Second end 40 includes internal threads 42 which are configured to receive standard filtration and polarization lens elements.

Scope adapter 18 mounts onto scope 12 by means of threaded section 32, and attaches to elongated tubular member 22 by means of a press fit wherein second end 30 slidably fits into one end of elongated tubular member 22. Shoulder 34 serves to limit the extent to which first end 25 may be threadably mounted into a scope. Shoulder 34, by abutting against chamfer 27, also limits the extent to which second end 30 may slide inside elongated tubular member 22. By altering the number of threads per inch and threaded outside diameter of threaded section 32, scope adapter 18 can be mounted onto a plurality of scopes of different makes and configurations.

Filter adapter 20 is mounted onto elongated tubular member 22 by means of a press fit wherein first end 38 is slidably received inside second end 26 of elongated tubular member 22. The abutment of chamfer 27 against shoulder 41 limits the extent to which first end 38 is slid inside tubular member 22. Internal threads 42 serve to threadably mount a filter element within second end 40. The extent to which a filter element is threaded into second end 40 is limited by abutment of the filter element against internal shoulder 41. It should be appreciated that different means for securing scope adapter 18 and filter adapter 20 respectively to a scope 12 and filter element and to elongated tubular member 22 may be used without departing from the spirit of the invention described herein.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A scope accessory operative to reduce glare and parallax error and adapted for mounting onto an optical scope which has a light collecting end, a viewing end and a viewing axis, said scope accessory comprising:
   (a) an elongated tubular member of a selected longitudinal length extending along a longitudinal axis and having opposite first and second ends; and
   (b) a scope mount adapted to mount the first end of said elongated tubular member onto the light collecting end of said scope whereby said tubular member is supported in a substantially rigid manner thereon with the longitudinal axis of said elongated tubular member oriented colinearly with the viewing axis of said scope, the length of said tubular member being selected to be of sufficient dimension such that said elongated tubular member allows only those light rays traveling substantially parallel to the longitudinal axis to enter the second end of the tubular member and thereafter reach said light collecting end of said scope thereby both reducing the field of view seen through said scope for any line of sight which diverges from the viewing axis and minimizing glare when in use.

2. A scope accessory according to claim 1 wherein said scope mount is formed as a generally tubular scope adapter member having first and second scope adapter ends, said first scope adapter end sized for mounting onto the light collecting end of said scope and said second scope adapter end secured to the first end of said elongated tubular member.

3. A scope accessory according to claim 2 wherein the light collecting end of said scope is provided with accessory mounting threads, said first scope adapter end including a threaded end section configured to threadably mate onto said accessory mounting threads.

4. A scope accessory according to claim 1 wherein said scope accessory includes a filter adapter secured to the second end of said tubular member, said filter adapter operative to mount onto said tubular member optical elements which alter the character of the light passing into said tubular member.

5. A scope accessory according to claim 4 wherein said filter adapter has a generally tubular shape having first and second filter adapter ends, said first filter adapter end configured to mount onto the second end of said elongated tubular member and said second filter adapter end configured to receive said optical elements.

6. A scope accessory according to claim 5 wherein said second filter adapter end includes an internal threaded section, whereby said optical elements may be threadably mounted inside of said filter adapter.

7. A scope accessory according to claim 1 wherein said scope is attached to a firearm having a barrel with a longitudinal barrel axis such that said viewing axis and said barrel axis are parallel, said elongated tubular member being sized so that, when said elongated tubular member is attached to the light collecting end of said scope, the length of said tubular member extends in a parallel relation with said barrel for a sufficient distance along said barrel to prevent a field of view as seen through said scope from being distorted by heat rising from said barrel.

* * * * *